H. ALBERS.
Thill-Coupling.
No. 222,120. Patented Dec. 2, 1879.
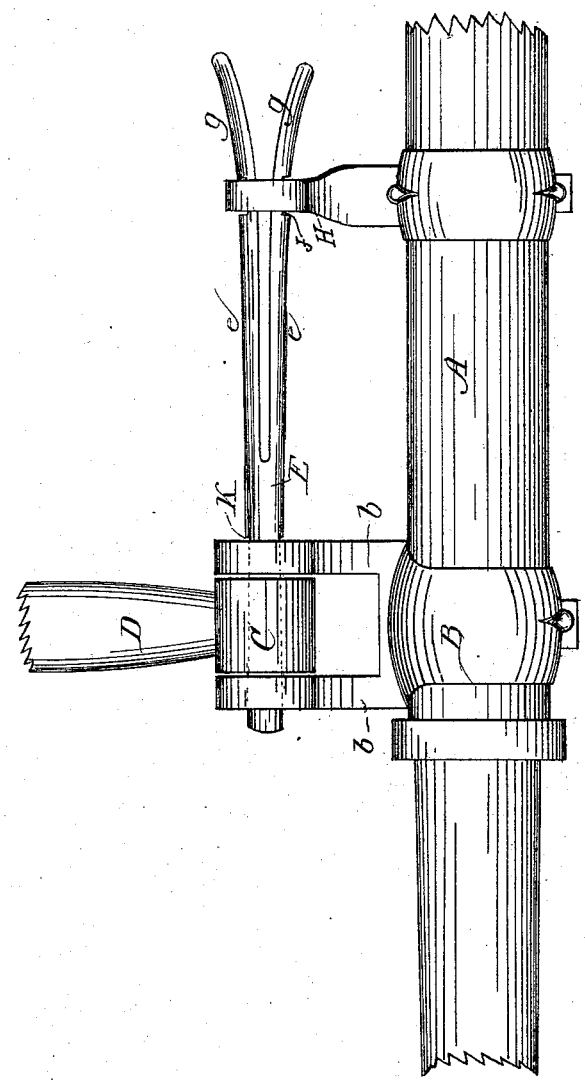
Attest.
Jno. W. Strehli
E. K. Neill
Inventor
Henry Albers, per
Wm. Hubbell Fisher,
Atty

UNITED STATES PATENT OFFICE.

HENRY ALBERS, OF NEW BREMEN, OHIO, ASSIGNOR OF TWO-THIRDS OF HIS RIGHT TO EDWARD PURPUS AND HERMAN LAUT, OF SAME PLACE.

IMPROVEMENT IN THILL-COUPLINGS.

Specification forming part of Letters Patent No. 222,120, dated December 2, 1879; application filed December 26, 1878.

*To all whom it may concern:*

Be it known that I, HENRY ALBERS, of the town of New Bremen, county of Auglaize, and State of Ohio, have invented certain new and useful Improvements in Thill-Couplings, of which the following is a specification.

My invention has for its object a convenient and economical means for expeditiously coupling and uncoupling the thill to the vehicle and for holding the coupling pin or bolt in position.

The invention consists of a coupling-pin split lengthwise at one end, the halves of the split portion being so formed that they together operate in conjunction with an eye, supported from the vehicle or otherwise, as a spring-catch to retain the coupling-pin in position, and also enable it to be instantly withdrawn from the thill to uncouple the latter from the vehicle, and as quickly replaced when it is desired to couple the same.

In the accompanying drawing, making a part of this specification, the figure is a plan view of a thill-coupling embodying my invention.

A is a portion of an axle, to which is attached the clip B, the latter having the ordinary lugs $b$, which receive between them the eye C of the thill-iron D.

The lugs $b$ and thill-eye C are perforated, as usual, to receive the coupling pin or bolt E. This pin E is longer than the coupling-pins commonly employed in this connection, and its extended portion is split, each of the split portions being exteriorly provided with a groove, $f$, large enough to admit the edge of an eye, H, hereinafter mentioned. The split portions are, when at liberty, spread apart much wider than they are permitted to do when forced within eye H.

The extremity $g$ of each portion $e$ is, preferably, finished off, as shown, so as to afford an easy hold for the fingers of the person coupling or uncoupling the thill.

To the cap of a clip on the axle is fixed an eye, H, whose hole is just large enough to allow the pin E to pass through when the split portions $e$ thereof are pressed together.

This eye may, when preferred, be supported in ways other than the one herein shown; and any particular means or mode of supporting it is not a necessary element of this invention.

To uncouple the thill, press together the extremities $g$, so that the inner edges of the grooves $f$ no longer impinge against the sides of the eye. The pin is then withdrawn, and the thill thus uncoupled from the vehicle.

To couple the vehicle the pin is passed along through the eye and through the lugs $b$ and the eye C of thill-iron till the grooves $f$ are opposite the eye H, when the tendency of the split parts to spread from each other will cause the groove to inclose the eye H, as shown in the figure, and thus lock the pin in position. The entire operation of coupling or uncoupling the thill is but the work of a few seconds.

For the purpose of preventing the pin from accidentally slipping too far through the hole in the lugs $b$ while the portions $e$ are compressed together, and thus preventing the groove from locking with the eye H, I preferably provide the pin with a shoulder, K. My device, however, is operative, and will frequently be used without said shoulder.

It may be also remarked that it is immaterial to the efficacy of my invention whether the lugs $b$ are attached to clip B and eye C to the thill, or the lugs $b$ are attached to the thill and the eye C to the clip.

What I claim as new and of my invention is—

1. The thill-coupling pin E, provided with portions $e$ and grooves $f$, in combination with eye H, substantially as and for the purposes set forth.

2. The thill-coupling pin E, provided with portions $e$, grooves $f$, and shoulder K, in combination with eye H and the lugs $b$ and eye C, substantially as and for the purposes specified.

HENRY ALBERS.

Attest:
ED. PURPUS,
CHRIST LAUT.